US010887087B2

(12) United States Patent
Viswanathan et al.

(10) Patent No.: US 10,887,087 B2
(45) Date of Patent: *Jan. 5, 2021

(54) SECURE AND DISRUPTION-TOLERANT COMMUNICATIONS FOR UNMANNED UNDERWATER VEHICLES

(71) Applicant: THE BOEING COMPANY, Chicago, IL (US)

(72) Inventors: Kapaleeswaran Viswanathan, Bangalore (IN); Fred L. Templin, North Bend, WA (US); Gregory T. Cooper, Long Beach, CA (US)

(73) Assignee: THE BOEING COMPANY, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/546,727

(22) Filed: Aug. 21, 2019

(65) Prior Publication Data

US 2019/0386823 A1 Dec. 19, 2019

Related U.S. Application Data

(63) Continuation of application No. 15/724,831, filed on Oct. 4, 2017, now Pat. No. 10,447,470.

(51) Int. Cl.
*H04L 9/08* (2006.01)
*H04L 12/54* (2013.01)
(Continued)

(52) U.S. Cl.
CPC ........... *H04L 9/0825* (2013.01); *B63G 8/001* (2013.01); *G06F 21/602* (2013.01); *G06F 21/62* (2013.01);
(Continued)

(58) Field of Classification Search
CPC ... H04L 9/0825; H04L 9/0847; H04L 9/3268; H04L 9/3263; H04L 12/56; H04L 12/66;
(Continued)

(56) References Cited

U.S. PATENT DOCUMENTS

| 5,303,207 A | * | 4/1994 | Brady | .................... H04B 13/02 367/134 |
| 7,409,569 B2 | * | 8/2008 | Illowsky | ............... G06F 1/3203 713/323 |

(Continued)

OTHER PUBLICATIONS

Author: Cerf et al., Title: Delay Tolerant Networking Architecture, Date: Apr. 2007 (Year: 2007).*

(Continued)

*Primary Examiner* — Franklin D Balseca
(74) *Attorney, Agent, or Firm* — Patterson + Sheridan, LLP

(57) ABSTRACT

An underwater communications system includes a network communication interface, one or more computer processors, and a memory containing computer program code that, when executed by operation of the one or more computer processors, performs an operation. The operation includes storing a plurality of data packets to be transmitted to a destination device, determining that data communications over the network communication interface have become available for a first network node, and determining that the first network node has a valid security credential. Additionally, the operation includes, upon determining that the first network node has the valid security credential, transmitting the stored plurality of data packets over the network communication interface to the first network node. The first network node is configured to employ store-carry-and-forward data messaging techniques to transmit the plurality of data packets towards the destination device.

20 Claims, 12 Drawing Sheets

(51) Int. Cl.

| | |
|---|---|
| H04L 9/32 | (2006.01) |
| H04L 29/06 | (2006.01) |
| G06F 21/60 | (2013.01) |
| H04L 12/58 | (2006.01) |
| H04L 12/66 | (2006.01) |
| H04L 29/08 | (2006.01) |
| G06Q 10/10 | (2012.01) |
| H04N 1/32 | (2006.01) |
| H04B 11/00 | (2006.01) |
| H04B 13/02 | (2006.01) |
| H04W 40/02 | (2009.01) |
| H04N 21/258 | (2011.01) |
| G06F 21/62 | (2013.01) |
| H04W 4/12 | (2009.01) |
| H04M 3/533 | (2006.01) |
| B63G 8/00 | (2006.01) |
| G08G 1/0967 | (2006.01) |
| H04L 12/751 | (2013.01) |
| H04W 40/24 | (2009.01) |
| H04W 4/40 | (2018.01) |
| G08G 3/02 | (2006.01) |
| H04L 12/703 | (2013.01) |
| H04W 88/16 | (2009.01) |
| B63B 35/00 | (2020.01) |

(52) U.S. Cl.
CPC ..... *G06Q 10/107* (2013.01); *G08G 1/096791* (2013.01); *H04B 11/00* (2013.01); *H04B 13/02* (2013.01); *H04L 9/0847* (2013.01); *H04L 9/3263* (2013.01); *H04L 9/3268* (2013.01); *H04L 12/56* (2013.01); *H04L 12/66* (2013.01); *H04L 45/02* (2013.01); *H04L 51/14* (2013.01); *H04L 51/38* (2013.01); *H04L 63/101* (2013.01); *H04L 67/12* (2013.01); *H04L 67/2842* (2013.01); *H04M 3/533* (2013.01); *H04N 1/32406* (2013.01); *H04N 1/32411* (2013.01); *H04N 21/2585* (2013.01); *H04W 4/12* (2013.01); *H04W 40/02* (2013.01); *H04W 40/24* (2013.01); *B63B 2035/007* (2013.01); *B63B 2203/00* (2013.01); *B63B 2213/02* (2013.01); *B63G 2008/004* (2013.01); *G08G 3/02* (2013.01); *H04L 45/28* (2013.01); *H04W 4/40* (2018.02); *H04W 88/16* (2013.01)

(58) Field of Classification Search
CPC ......... H04L 45/02; H04L 45/28; H04L 51/14; H04L 51/38; H04L 63/101; H04L 67/12; H04L 67/2842; B63G 8/001; B63G 2008/004; G06F 21/602; G06F 21/62; G06Q 10/107; G08G 1/096791; G08G 3/02; H04B 11/00; H04B 13/02; H04M 3/533; H04N 1/32406; H04N 1/32411; H04N 21/2585; H04W 4/12; H04W 4/40; H04W 40/02; H04W 40/24; H04W 88/16; B63B 2035/007; B63B 2203/00; B63B 2213/02

See application file for complete search history.

(56) References Cited

U.S. PATENT DOCUMENTS

| | | | | |
|---|---|---|---|---|
| 7,853,785 | B1* | 12/2010 | Thurman | H04W 12/0403 713/158 |
| 8,327,232 | B2* | 12/2012 | Budampati | H04L 1/1845 714/746 |
| 9,621,356 | B2* | 4/2017 | Vaid | H04L 9/3268 |
| 9,877,088 | B2* | 1/2018 | Abuelsaad | H04Q 9/00 |
| 9,906,513 | B2* | 2/2018 | Wuehler | H04L 63/08 |
| 10,104,549 | B2* | 10/2018 | Fogle-Weekley | H04W 12/04 |
| 2008/0060062 | A1* | 3/2008 | Lord | G06F 21/33 726/5 |
| 2012/0008773 | A1* | 1/2012 | Westerveld | H04N 7/1675 380/220 |
| 2018/0135987 | A1* | 5/2018 | Evans | A61G 5/04 |
| 2019/0103960 | A1 | 4/2019 | Viswanathan et al. | |

OTHER PUBLICATIONS

Extended European Search Report for Applicatoin No. 18-96497.4-1218 dated Sep. 11, 2018.

Gianluca Dini et al: "A Secure Communication Suite for Underwater Acoustic Sensor Networks", Sensors, vol. 12, No. 11, Nov. 7, 2012 (Nov. 7, 2012), pp. 15133-15158, XP55520383, DOI: 10.3390/s121115133.

Suraj S. Kasture et al., "Securing Underwater Wireless Communication Networks-Literature Review," International Journal of Scientific Engineering Research, 2013.

Das Anjana P et al., "Secure Communications in Mobile Underwater wireless networks," 2015 International Conference in computing, Comunications and Informatics.

Author. Cert et al., Title: Delay Tolerant Networking Architecture, Date: Apr. 2007 (Year: 2007).

* cited by examiner

SECURE AND DISRUPTION-TOLERANT COMMUNICATIONS FOR UNMANNED UNDERWATER VEHICLES

CROSS-REFERENCE TO RELATED APPLICATIONS

The present disclosure is a continuation of U.S. patent application Ser. No. 15/724,831, filed on Oct. 4, 2017 and issued on Oct. 5, 2019 as U.S. Pat. No. 10,447,470, which is incorporated herein by reference in its entirety.

FIELD

Aspects described herein relate to underwater communications, and more specifically, to techniques for providing secure and disruption-tolerant network underwater communications.

BACKGROUND

Despite covering 70% of the earths' surface, little is known about the subsea environment. The environment's nearly-impermeable communication medium and substantial pressures make accessing subsea information a daunting challenge. Nonetheless, subsea acoustic communication systems could soon be used to provide widespread information about the subsea environment. However, conventional solutions do not allow for secure and reliable network communications for underwater vehicles. For instance, while communication protocols like TCP/IP can provide reliable and secure network communications in some situations, these techniques are frequently ill-suited for underwater communications. As an example, communication systems such as TCP/IP require all hops within a point-to-point communications link to be active simultaneously, whereas hops for an underwater communication system may frequently experience intermittent connectivity.

Moreover, significantly delayed and disrupted data transmissions are common within many environments such as communications for underwater vehicles. In these environments, data being transmitted from a data source to a destination is further delayed when prior external communications (e.g., an exchange of cryptography keys) are required before successful transmission of the data. As conventional techniques for cryptography key distribution typically require at least one communication before the source can securely transmit data to a destination, these techniques may not be suitable for underwater communication networks where access to data transmissions is highly intermittent.

SUMMARY

According to one embodiment of the present invention, an underwater communications system includes a network communication interface, one or more computer processors, and a memory containing computer program code that, when executed by operation of the one or more computer processors, performs an operation. The operation includes storing a plurality of data packets to be transmitted to a destination device. The operation also includes determining that data communications over the network communication interface have become available for a first network node. Additionally, the operation includes determining that the first network node has a valid security credential. The operation further includes, upon determining that the first network node has the valid security credential, transmitting the stored plurality of data packets over the network communication interface to the first network node, where the first network node is configured to employ store-carry-and-forward data messaging techniques to transmit the plurality of data packets towards the destination device. The operation further includes receiving a revocation message relating to the first network node and verifying validity of the revocation message, based at least in part on a key stored in the underwater communication system.

In one aspect, in combination with any example above, determining that the first network node has the valid security credential further includes determining that the security credential has not been revoked by an access authority.

In one aspect, in combination with any example above, the operation further includes storing a second plurality of data packets to be transmitted to a second destination device, determining that the data communications over the network communication interface are available for the first network node, for transmission of the second plurality of data packets, and determining that the first network node no longer has the valid security credential, based on verifying validity of the revocation message.

In one aspect, in combination with any example above, determining that the first network node no longer has the valid security credential further includes determining that a first identifier corresponding to the first network node matches a second identifier within a revocation list, where the revocation list includes a plurality of identifiers of network nodes having revoked access to at least one of a public master key and a private decryption key, and as a result, preventing transmission of the stored second plurality of data packets to the first network node.

In one aspect, in combination with any example above, operation further includes receiving an identifier, an address and proof of identification associated with the underwater communications system, generating a private decryption key that is unique to the underwater communications system, and generating a public master key and an access denial master key, where the key stored in the underwater communication system includes at least one of the public master key or the access denial master key, and where the key is configured for use in verifying revoked access to the public master key or the private decryption key.

In one aspect, in combination with any example above, the operation further includes transmitting the revocation message to the underwater communications system indicating at least one message recipient having revoked access to the public master key or the private decryption key.

In one aspect, in combination with any example above, verifying validity of the revocation message further includes receiving and verifying validity of the revocation message, based at least in part on the access denial master key, and in response to verifying validity of the revocation message, updating the revocation list to include an identifier of the at least one message recipient.

In one aspect, in combination with any example above, the operation further includes, upon determining that the first network node has the valid security credential, generating an ephemeral copy of a public encryption key, by passing a public master key, a validity period, and an identifier of the destination device as inputs for a key generator module, and encrypting the plurality of data packets using the generated ephemeral copy of the public encryption key.

In one aspect, in combination with any example above, the network communication interface further includes an acoustics data transmission device.

In one aspect, in combination with any example above, transmitting the stored plurality of data packets over the network communication interface to the first network node employing store-carry-and-forward data messaging techniques to transmit the plurality of data packets towards the destination device, further includes, for a first one of the plurality of data packets, determining that a retransmission condition has been satisfied, and retransmitting the first data packet over the network communication interface to the first network node.

In one aspect, in combination with any example above, the retransmission condition includes at least one of (i) determining that an error occurred at an upstream network node and (ii) the first network node declining acceptance of the first data packet.

In one aspect, in combination with any example above, the store-carry-and-forward data messaging techniques further include a Delay and Disruption-Tolerant Networking (DTN) protocol, where the DTN protocol includes overlaying a bundle protocol layer on top of one or more lower-layer networking protocol headers, where the one or more lower-layer networking protocol headers further include an Internet protocol (IP) layer.

In one aspect, in combination with any example above, the bundle protocol layer further includes (i) a bundle header including one or more DTN blocks and (ii) application data.

In one aspect, in combination with any example above, the application data further includes control information provided by a source application and that describes how to process payload data.

Another embodiment provides a network device for use in an underwater communications network in which at least one network node includes an underwater vehicle, the network device includes a first network communication interface, a second network communication interface, one or more computer processors, and a memory containing computer program code that, when executed by operation of the one or more computer processors, performs an operation. The operation includes receiving, over the first network communication interface, from a first network node, a plurality of data packets to be transmitted to a destination device. The operation further includes storing the plurality of data packets, determining that data communications over the network communication interface have become available for a second network node, determining that the second network node has a valid security credential, and, upon determining that the second network node has the valid security credential, transmitting the stored plurality of data packets over the second network communication interface to the second network node. The operation further includes receiving a revocation message relating to second first network node and verifying validity of the revocation message, based at least in part on a key stored in the underwater communications network.

In one aspect, in combination with any example above, the first network communication interface includes an acoustics transceiver for sending acoustic transmissions to and receiving acoustic transmissions from an underwater vehicle.

In one aspect, in combination with any example above, the second network communication interface includes a radio signal transceiver for sending radio signals to and receiving radio signals from at least one of a satellite and an aerial vehicle.

In one aspect, in combination with any example above, the operation further includes receiving, over the first network communication interface, from the first network node, a second plurality of data packets to be transmitted to the destination device, storing the second plurality of data packets, subsequent to storing the second plurality of data packets, determining that the data communications over the network communication interface have become available for the second network node, determining that the second network node no longer has the valid security credential, based on verifying validity of the revocation message, including determining that a first identifier corresponding to the second network node matches a second identifier within a revocation list, and as a result, preventing transmission of the stored second plurality of data packets to the second network node.

In one aspect, in combination with any example above, the operation further includes receiving an identifier, an address, and proof of identification associated with the network device, generating a private decryption key that is unique to the network device, generating a public master key and an access denial master key, where the key stored in the underwater communications network includes at least one of the public master key or the access denial master key, and where the key is configured for use in verifying revoked access to the public master key or the private decryption key.

Another embodiment provides an underwater communications system, including a network communication interface, one or more computer processors and a memory containing computer program code that, when executed by operation of the one or more computer processors, performs an operation. The operation includes determining, through the use of identity-based cryptography (IDBC) together with a Public-Key Distribution Network (PKDN), that a second network device is an authorized network device. The operation further includes, upon determining that the second network device is the authorized network device, sending, through the use of a Delay and Disruption-Tolerant Networking (DTN) network protocol, over the network communication interface, a plurality of data packets to the second network device, to be transmitted to a destination device, receiving a revocation message relating to the second network device, and verifying validity of the revocation message, based at least in part on a key stored in the underwater communications system.

BRIEF DESCRIPTION OF ILLUSTRATIONS

DETAILED DESCRIPTION

Generally, embodiments provide techniques for secure communications for underwater vehicles. There are a number of challenges for a communications network that bridges underwater vehicles to above-water network nodes (e.g., a land-based surveillance station). For instance, many types of data communications typically employed by above-water networks simply do not function in an underwater environment. While underwater vehicles can make use of acoustics-based data transmissions, such communication techniques are typically limited to extremely low bandwidth (e.g., compared to WiFi networks, Ethernet networks, satellite networks, etc.). Moreover, acoustics-based data communications may experience service interruptions, e.g., when the underwater vehicle moves out of communications range of any nearby network nodes, during communication jamming activities, etc. Such service interruptions may render many traditional network communication protocols (e.g., TCP/IP) unsuitable or problematic.

As such, embodiments described herein provide techniques for secure data communications for an underwater vehicle. One embodiment includes computer logic on the underwater vehicle that encrypts a plurality of data packets using a public encryption key. For example, the public encryption key could be provided by Public-Key Distribution Network (PKDN). The encrypted data packets can then be stored at the underwater vehicle, until a suitable network node is available for transmitting the encrypted data packets towards their destination. Logic on the underwater vehicle could determine, through the use of identity-based cryptography (IDBC), that a second network device is an authorized network device within the data communications network. For example, the logic could determine whether an identifier of the second network device corresponds to an identifier within a revocation list, where the revocation list contains identifiers of unauthorized devices received from an access denying authority. Upon determining that the second network device is the authorized network device, sending, through the use of store-carry and forward networking techniques, over the network communication interface, a plurality of data packets to the second network device. For example, the logic could use the Delay and Disruption-Tolerant Networking (DTN) network protocol to transmit the encrypted data packets.

Figure 1:
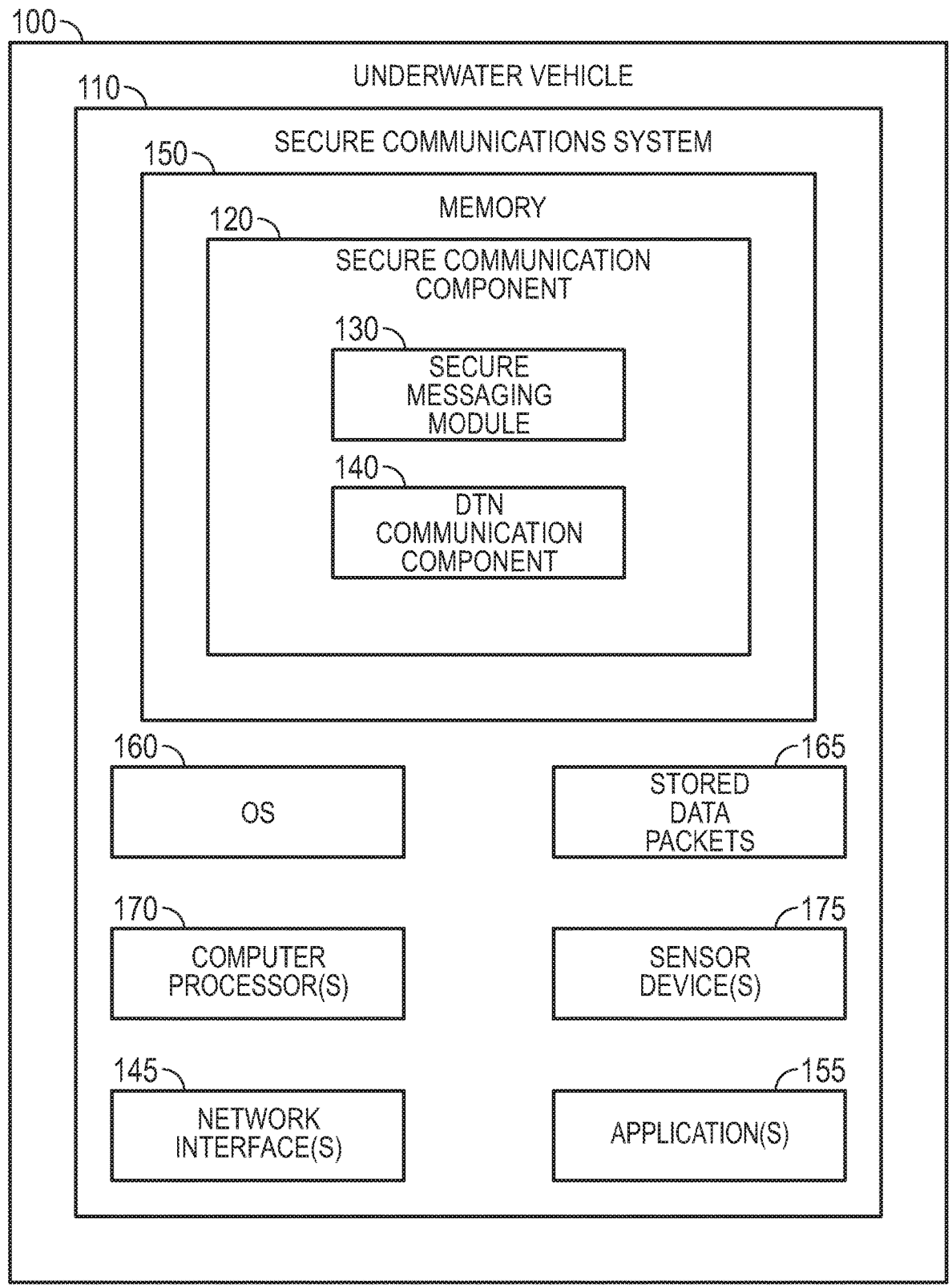
FIG. 1 is a block diagram illustrating an underwater vehicle configured with a secure communication component, according to one embodiment described herein.

FIG. 1 is a block diagram illustrating an underwater vehicle configured with a secure communication component 120, according to one embodiment described herein. As shown, the underwater vehicle 100 includes a secure communications system 110 and application(s) 155. The secure communication system 110 includes a network interface(s) 145, a memory 150, a computer processor(s) 170, and sensor device(s) 175. The memory 150 includes a secure communication component 120, an operating system 160, and stored data packets 165. Generally, the application(s) 155 represents a software application running on a computer system within the underwater vehicle 100. Generally, the sensor device(s) 175 represent any sensor devices suitable for incorporation in an underwater vehicle 100, with examples including (without limitation) camera devices, sonar devices, radar devices, temperature devices, accelerometer devices, and so on. For example, the application(s) 155 could be an application that collects data using one or more sensor devices 175 within the underwater vehicle 100 and transmits, using the secure communications system 110, data packets containing at least an indication of the collected data to one or more destination devices (e.g., a land-based surveillance system).

Generally, the secure communication component 120 can use store—carry and forward transmission techniques to send data packets to their respective destinations. That is, as discussed above, standard networking techniques such as TCP/IP may be unsuitable for use in underwater data communications, as the underwater vehicle 100 may experience service disruptions (e.g., when the underwater vehicle 100 travels out of range of any nearby communication nodes). Moreover, as the network interface(s) 145 may communicate using acoustics-based data communications, the network interface(s) 145 may have a relatively small bandwidth, which could cause conventional data communication sessions to timeout or otherwise fail.

As such, upon receiving the data packets from the application(s) 155, the secure communication component 120 could store the data packets for subsequent transmission towards the destination device. For example, the secure communication component 120 could store the data packets 165 until a transmission criteria is satisfied, e.g., a sufficient bundle size of data packets is reached. Additionally, in the event the secure communications system 110 loses network connectivity over the network interface(s) 145 (e.g., when the underwater vehicle 100 goes out of range of any adjacent network nodes), the secure communication component 120 could continue to store data packets until the network connectivity is reestablished.

At some point, the secure communication component 120 can determine to send at least a portion of the stored data packets 165. For instance, the secure messaging module 130 could determine that an adjacent network device is available and is suitable for transmitting the stored data packets 165 towards their intended destination. As an example, the secure messaging module 130 could determine that a recognized surface aquatic vehicle (e.g., an unmanned ship) is within transmission range of the secure communications system 110 (e.g., based on receiving an acknowledgement message from the surface aquatic vehicle over the network interface(s) 145). The secure messaging module 130 could then determine, through the use of IDBC techniques, whether the surface aquatic vehicle is an authorized network device. For example, the secure messaging module 130 could determine a unique identifier corresponding to the surface aquatic vehicle and could determine whether the unique identifier corresponds to an identifier on a revocation list maintained by the secure messaging module 130. If the surface aquatic vehicle does not correspond to any identifiers on the revocation list, the secure messaging module 130 could determine that the surface aquatic vehicle is an authorized network device for use in transmitting the data packets towards their intended destination.

Additionally, the secure messaging module 130 could determine whether an identifier for the specified destination of the data packets corresponds to an identifier within the revocation list. In the event the secure messaging module 130 determines that the destination device's identifier corresponds to an identifier within the revocation list, the secure messaging module 130 could prevent the transmission of the stored data packets 165. For example, the secure messaging module 130 could delete the stored data packets 165 and could generate (and, in some cases, transmit) a message indicating that the stored data packets 165 were not delivered.

The secure messaging module 130 could encrypt at least a portion of the data packets 165 (e.g., the payload of the data packets 165) using a public key received from a public key distribution network. The DTN communication component 140 could further overlay a bundle protocol layer header on top of one or more lower layer networking protocol headers within the data packets. For example, the secure messaging module 130 could overlay the header for the bundle protocol layer on top of the IP layer within the data packets. In one embodiment, the bundle protocol header is formatted according to the DTN protocol. For example, the bundle protocol layer could specify (i) a bundle header comprising one or more DTN blocks and (ii) application data describing control information provided by a source application and that describes how to process the payload data of the data packets.

The secure communication component 120 could then transmit the data packets containing the bundle protocol headers over the network interface(s) 145 to an adjacent network device, for transmission to a specified destination. For example, the secure communication component 120 within an underwater vehicle counter transmit the data packets to a surface aquatic vehicle (e.g., a ship) using acoustics-based data communications, which in turn could transmit the data packets to an aerial vehicle (e.g., a plane) using satellite communications, which could in turn transmit the data packets to their destination (e.g., a ground-based monitoring center) using radio communications.

Figure 2:
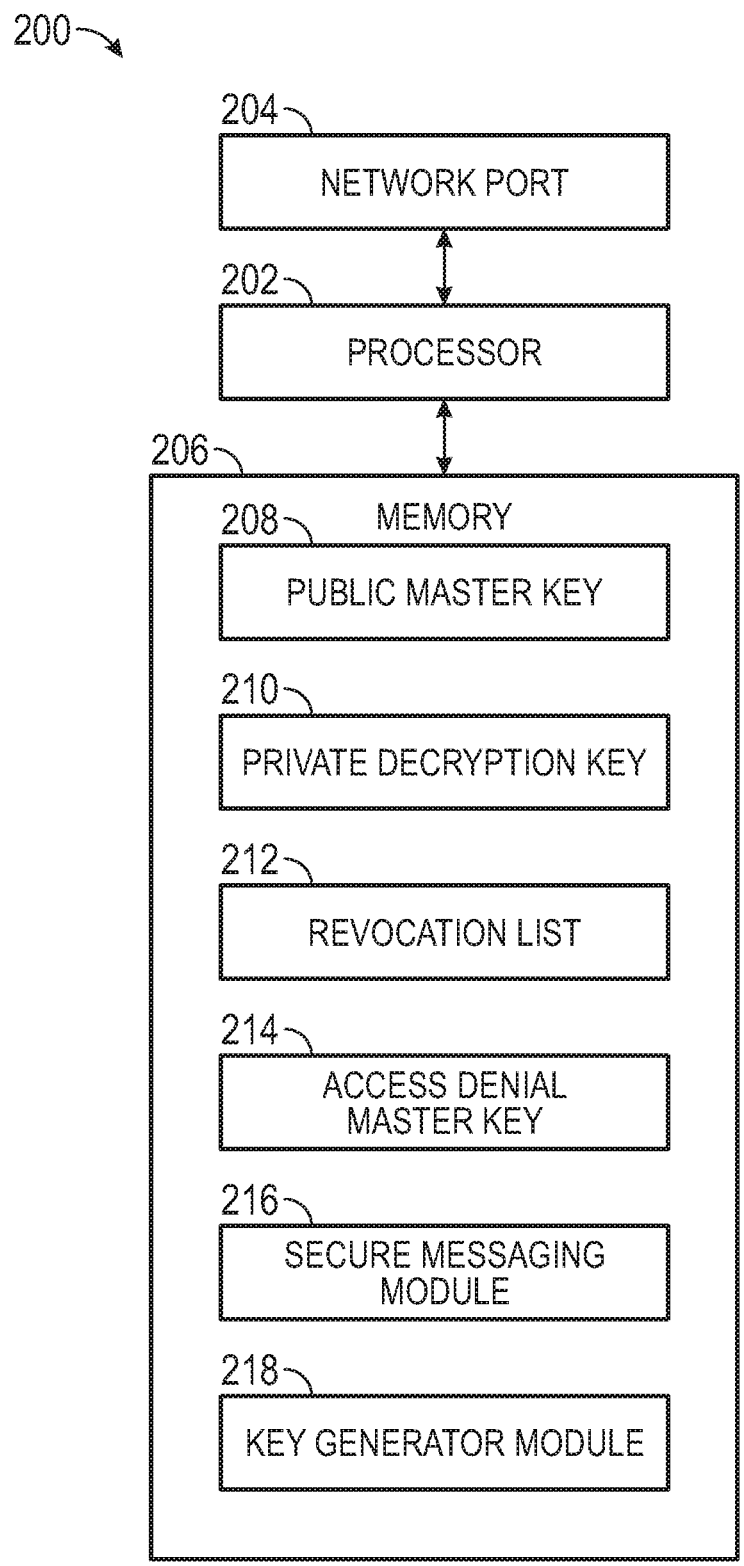
FIG. 2 illustrates an alternate view of the Secure Vehicle Communications System shown in FIG. 1, according to one embodiment described herein.

FIG. 2 illustrates an alternate view of the Secure Vehicle Communications System 110, according to one embodiment described herein. As shown, the system 200 includes a processor 202 operatively coupled to a network port 204 for a network interface 145, and memory 206 (e.g., a non-volatile storage medium). The network port may be connected to a communication network to permit transmission of data packets to an end-point computer. For example, the network port 204 could represent an acoustics transceiver for transmitting data packets in an underwater environment.

As shown, the memory 206 stores a public master key 208 for use in creating a public encryption key, a private decryption key 210 for use in decrypting an encrypted message, a revocation list 212 that includes identifiers of message recipients having revoked access to the public master key or private decryption key, and an access denial master key 214 for validating the revoked access thereof. The memory also stores a secure messaging module 130 and a key generator module 218.

Generally, an access granting authority may execute an access granting module configured to receive credentials associated with a respective system 200 such as an identifier, an address, and proof of identification of the respective system 200. Based thereon, the access granting module may be configured to generate and provide to the respective system 200 a private decryption key that is unique to the respective system 200, and could further generate and provide a public master key and an access denial master key for use in verifying revoked access to the public master key or the private decryption key. Additionally, an access denying authority may execute an access denying module configured to transmit a revocation message to the respective system 200 that indicates at least one message recipient having revoked access to the public master key or private decryption key. Generally, the private decryption key, public master key and access denial master key can be provided to and stored in a storage medium in the respective system 200, and upon receiving the revocation message from the access denying authority, logic for the respective system 200 can be configured to verify validity of the revocation message based at least in part on the access denial master key. In response to verifying validity of the revocation message, the system 200 may update a revocation list 212 stored in the storage medium to include an identifier of the at least one message recipient.

The processor 202 is generally configured to execute applications, such as the secure messaging module 130 and the key generator module 218. The key generator module is configured to generate public encryption keys using a key generation algorithm (e.g., an asymmetric key generation algorithm). Each of the public encryption keys is unique to a designated recipient (e.g., a land-based surveillance station) and generated using an input that includes the public master key 208, a validity period, and an identifier of the designated message recipient.

In some instances, the system 200 can act as an intermediary node (e.g., a hop) for data packets being transmitted from an underwater vehicle to a destination node (e.g., a land-based surveillance station). In such an embodiment, the system 200 may contain multiple network interfaces (e.g., an acoustics transceiver for receiving data packets from an underwater vehicle and a radio frequency transceiver for communicating with aerial network nodes and/or satellites). The system 200 could receive data packets over a first one of the network interfaces and could store the data packets (e.g., within memory 206) for subsequent transmission towards the destination node. Upon determining that an identifier of an adjacent network node (or an identifier of the designated recipient of the data packets) matches or corresponds to an identifier within the revocation list 212, the secure messaging module 130 could determine that the neighboring network node (or the designated recipient device) is not an authorized network node and could prevent transmission of the data packets to the neighboring network node (e.g., by delaying transmission of the data packets until an authorized neighboring network node is in range, by deleting the data packets, etc.). In such a situation, the secure messaging module 130 can transmit a message to notify a user of a failed transmission of the data packets. In one embodiment, the system 200 receives such a revocation message from an access denying authority (e.g., a remote computing system configured to manage network access within the communications network) that indicates revoked access for a designated message recipient. The authenticity of the message may be validated using the access denial master key 214, and the system can update the revocation list 212 to include an identifier of the recipient whose access has been revoked.

If the secure messaging module 130 determines that the identifier of the neighboring network node (or the identifier of the designated recipient of the data packets) does not match or correspond to an identifier within the revocation list 212, the secure messaging module 130 could determine that the neighboring network node and the designated recipient are authorized network nodes within the data communications network. The secure messaging module 130 could then execute the key generator module 218 to effect generation, locally at the system 200, of an ephemeral copy of a public encryption key that is unique to the designated message recipient in which the public encryption key is generated using the key generator module 218 and inputs including the public master key 208, a validity period, and an identifier of the designated message recipient. In these examples, the ephemeral copy of the public encryption key is not a duplicate of any public encryption key stored by a third-party directory of public encryption keys. The secure messaging module 130 could then encrypt the stored data packets using the ephemeral copy of the public encryption key, and the secure messaging module 130 could transmit the encrypted data packets towards the destination node (e.g., to the destination node directly, to a node along a path to the destination node, etc.) via the network port 204. In one embodiment, the secure messaging module 130 encrypts the data packets using an asymmetric encryption algorithm. In a particular embodiment, the secure messaging module 130 is configured to determine if the designated destination node for the data packets corresponds to an identifier of a message recipient in the locally stored revocation list 212, by comparing at least a portion of the destination node's alphanumeric address to an identifier of a destination node in the revocation list.

The system 200 accordingly enables locally generating encryption keys for a designated recipient without requiring maintenance and storage in memory of a large directory of public encryption keys corresponding to an extensive number of recipients who are verified to be secure (e.g., non-revoked). These example implementations may also enable sending data packets to trusted recipients without being required to maintain and store in memory a large directory of the numerous trusted recipients, which may be substantially larger than a list of non-trusted recipients (e.g., the revocation list 212). This results in more efficient data storage allocation and processing times for secure data transmission.

In some instances, the secure messaging module 130 may communicate directly with the destination node for the data packets (e.g., there are no hops along the path between the secure messaging module 130 and the destination node). For example, the secure messaging module 130 could be deployed within an aerial vehicle that can communicate directly (e.g., using satellite communications) with a land-based surveillance center that is the designated destination of the data packets. In such an embodiment, the secure messaging module 130 on the aerial vehicle could receive data packets (e.g., from a secure messaging module 130 on a nautical vehicle, via a satellite relay) and could store the data packets for subsequent transmission. In such an example, the data packets could comprise encrypted data packets that were encrypted by an upstream node in the communication path (e.g., by a secure messaging module 130 on an underwater vehicle, by the secure messaging module 130 on the nautical vehicle, etc.). The secure messaging module 130 could determine that the destination node is an authorized recipient of the data packets, based on a determination that the unique identifier of the designated destination node does not match or correspond to an identifier within the revocation list. Upon determining that the destination node is an authorized recipient, the secure messaging module 130 could decrypt the encrypted data packets using the private decryption key 210 stored locally in the memory 206 of the system 200 and transmit the decrypted data packets to the destination node.

Figure 3:
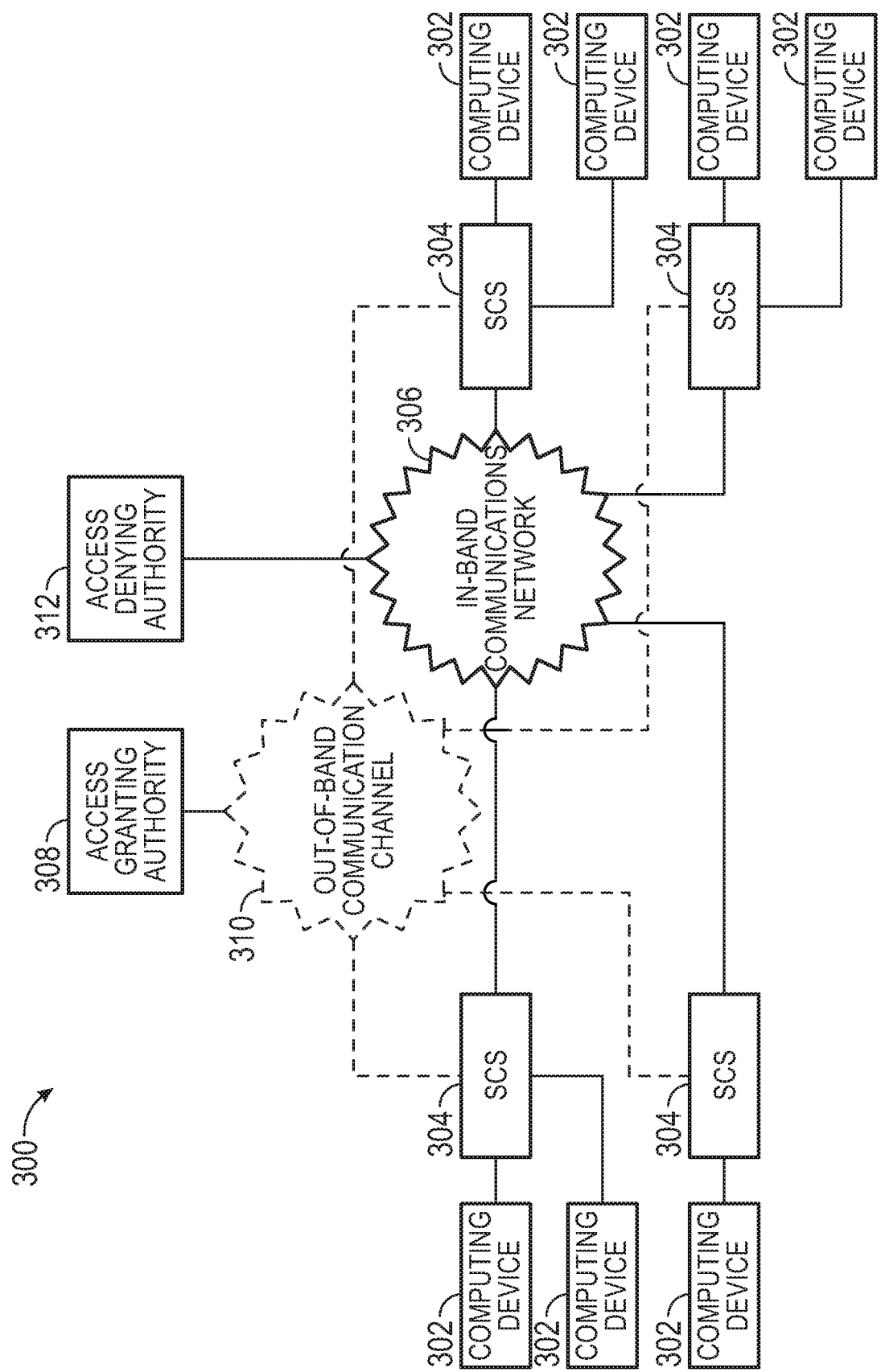
FIG. 3 is a block diagram illustrating a communications network for a plurality of computing devices, according to one embodiment described herein.

FIG. 3 is a block diagram illustrating a communications network for a plurality of computing devices, according to one embodiment described herein. As shown, the system 300 include a plurality of computing devices 302 (e.g., a system executing an application within an underwater vehicle, a system executing an application within a land-based surveillance center, etc.) connected to respective Secure Communication Systems 304 (e.g., the Secure Communications System 110) in which multiple computing devices may be connected to a single Secure Communications System 304. For example, two or more computing devices may execute software applications that are configured to collect data from sensor devices within an underwater vehicle, and the multiple software applications could share a single Secure Communications System 304 within the underwater vehicle.

The Secure Communications Systems 304 may be interconnected by an insecure in-band communications network 306 or communication medium such as the Internet. Additionally, the Secure Communications Systems 304 may have access to an access granting authority 308 over a secure out-of-band, point-to-point communication channel 310. The out-of-band communication channel may be or include a physical data courier such as a universal serial bus (USB) flash drive. The access granting authority enables a Secure Communications System 304 to securely send or receive messages from other Secure Communications Systems 304. An access denying authority 312 may revoke access for a Secure Communications System 304 by sending revocation messages to other Secure Communications Systems 304 via the in-band communications network 306.

Figure 4:
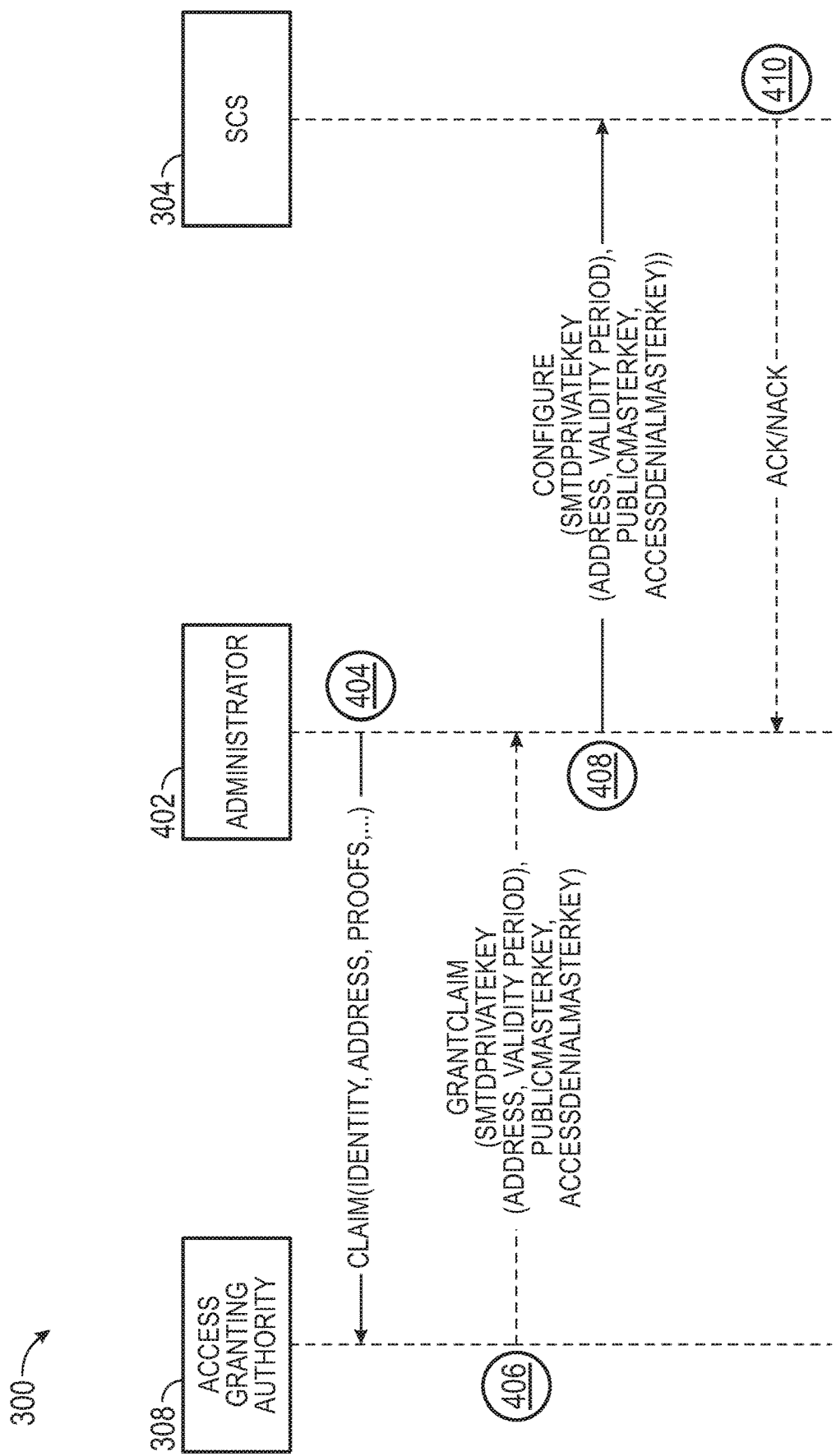
FIG. 4 illustrates a process of configuring a Secure Communications System, according to one embodiment described herein.

FIG. 4 illustrates a process of configuring a Secure Communications System, according to one embodiment described herein. As shown, an administrator 402 of the Secure Communications System can configure the Secure Communications System as detailed by the data transmissions of FIG. 4. In particular, the administrator 402 provides a claim to the access granting authority 308 that includes credentials such as an identifier, an address and proof of identity, as shown at transmission 404. In response, the access granting authority 308 grants access to the Secure Communications System for sending and receiving confidential messages and thereby transmits a private decryption key unique to the Secure Communications System, as shown at transmission 406. The private decryption key may be based on the address claimed and may have a validity period. The access granting authority 308 also transmits a public master key and an access denial master key, as part of transmission 406. The administrator 402 may then manually configure the Secure Communications System using the transmitted information, as shown at transmission 408. After the configuration is complete, the Secure Communications System responds with an acknowledgement message (at transmission 410), at which point the Secure Communications System can communicate with other Secure Communications Systems within the network environment.

Figure 5:
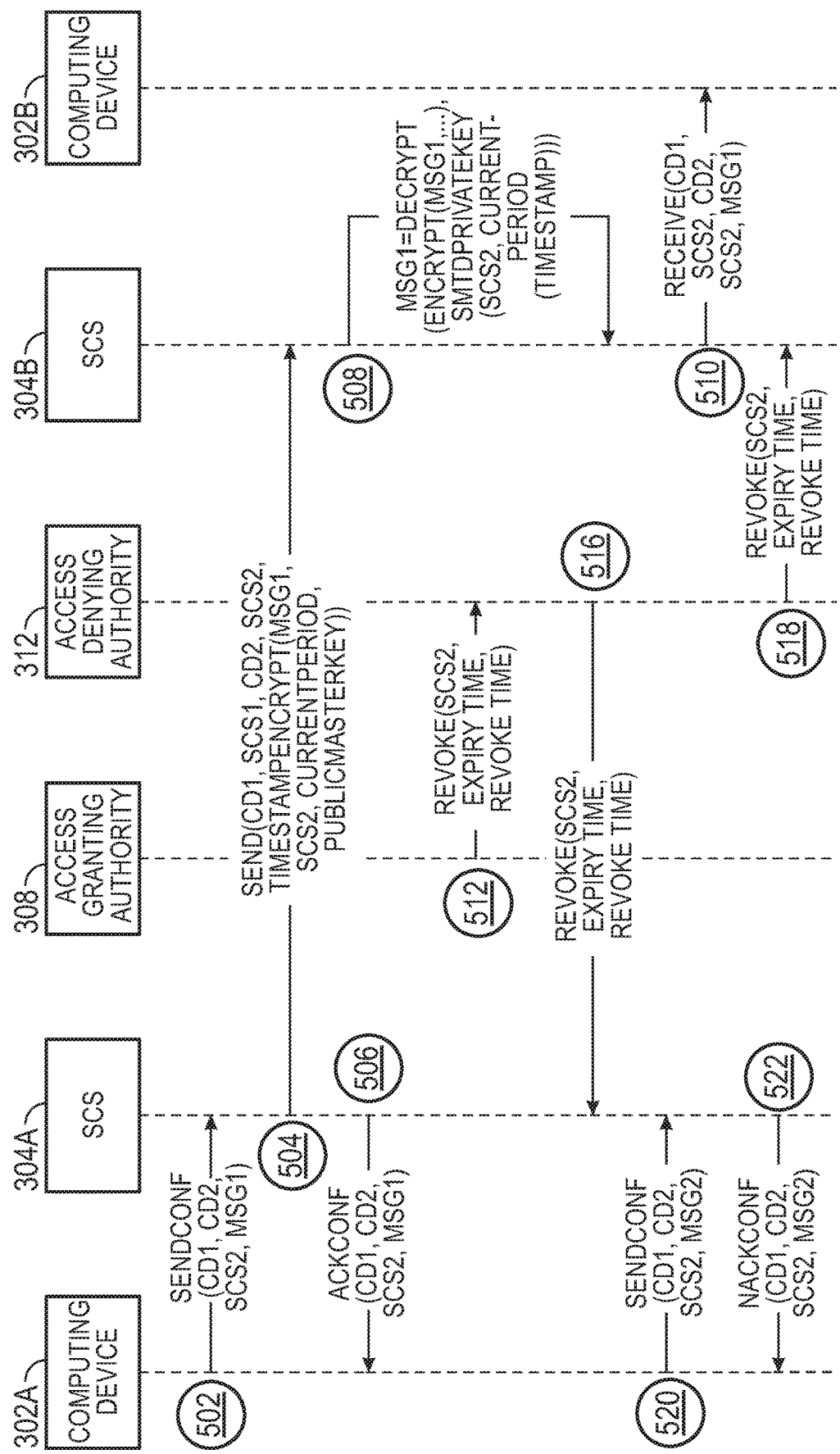
FIG. 5 illustrates a process of sending encrypted confidential messages, according to one embodiment described herein.

FIG. 5 illustrates a process for sending encrypted confidential messages (e.g., MSG1 and MSG2) from a source Secure Communications System 304A to a destination Secure Communications System 304B. For example, a confidential message could include one or more bundled data packets generated by a computing system on an underwater vehicle. For example, the Secure Communications Systems 304A and 304B can represent any two adjacent hops along a path between an underwater vehicle and a destination device (e.g., a computing system within a surveillance center). The Secure Communications Systems 304 may be respectively connected to computing devices 302A and 302B for sending and receiving the message. For example, the computing device 302A could represent a computing system within an underwater vehicle configured to collect and analyze sensor data from one or more sensor devices in the underwater vehicle. At transmission 502, a confidential message is generated by the computing device 302A and is sent to the connected Secure Communications System 304A.

At transmission 504, the Secure Communications System 304A computes an encryption key using the address of the destination Secure Communications System 304B, a current period as indicated by a timestamp and the public master key, and thereby encrypt the message. In the depicted embodiment, the Secure Communications System 304A acknowledges receipt and successful transmission of the message at transmission 506. At transmission 508, the destination Secure Communications System 304B receives and decrypts the encrypted message using the Private Key for that current period as received from the administrator 402. The decrypted message may be further transmitted and received by the destination computing device 302B at transmission 510 (e.g., a computing system within a surveillance station).

In some situations, the access granting authority 308 may transmit a message to the access denying authority 312, indicating that access for a particular Secure Communications System has been revoked. For example, at the transmission 512, the access granting authority informs the access denying authority of revoked access for the destination Secure Communications System 304B, and the access denying authority thereby sends a revocation message to each of the Secure Communications System 304A and 304B that specifies the identity of the revoked Secure Communications System, a expiry time and a revocation time, as shown by transmissions 516 and 518.

In these examples, if the access granting authority 308 has revoked the public key for the destination Secure Communications System 304B for a given validity period, then the source Secure Communications System 304A will refuse to send confidential messages to revoked destination Secure Communications System 304B. As shown in transmission 520 and 522, the source computing device 302A attempts to transmit a message the recipient computing device 302B via the revoked destination Secure Communications System 304B, and the source Secure Communications System 304A sends a negative acknowledgement to the computing device indicating the failed data transmission.

Figure 6:
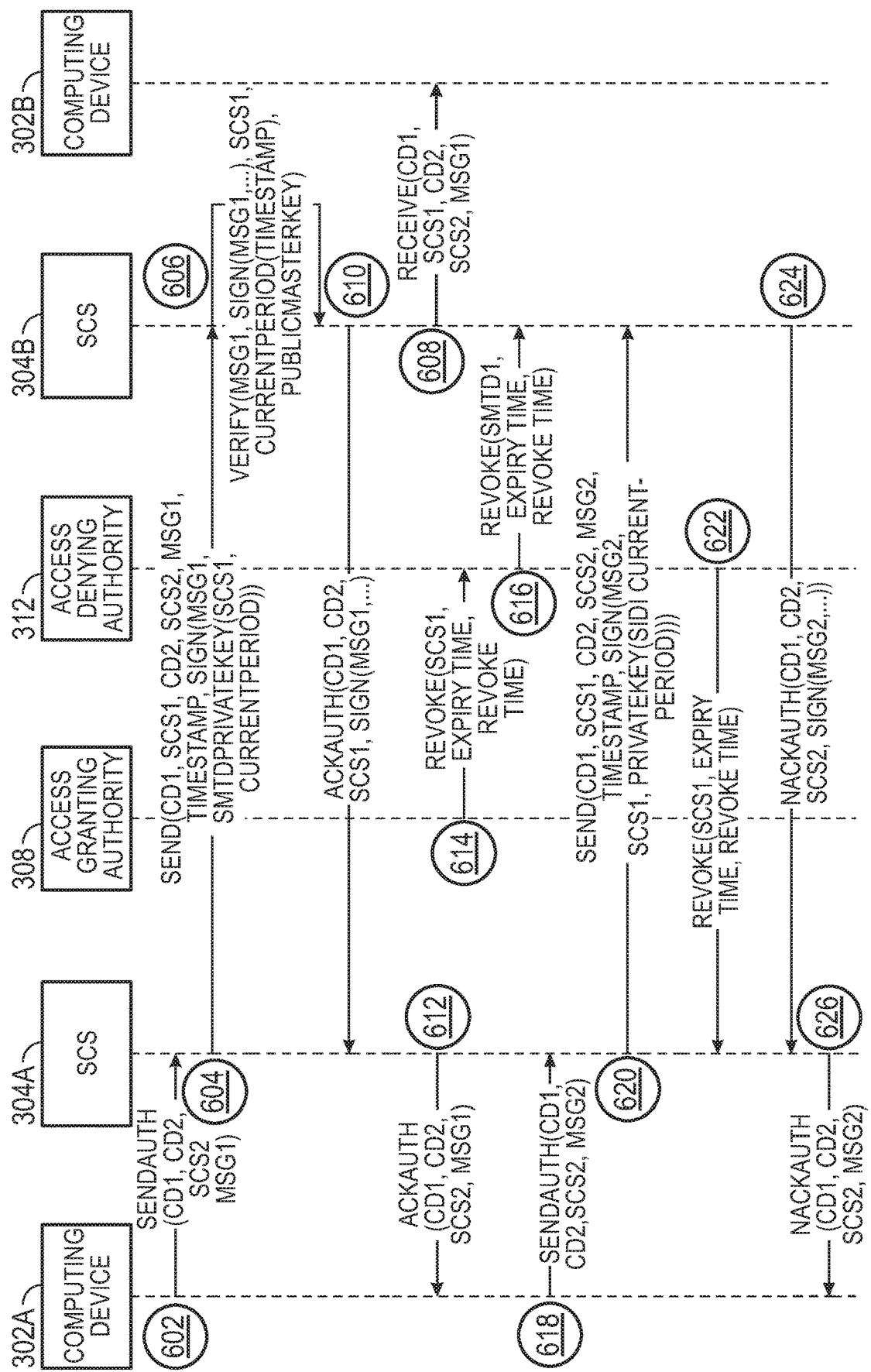
FIG. 6 illustrates a process of sending authenticated messages, according to one embodiment described herein.

FIG. 6 illustrates a process for sending authenticated or signed messages from the source Secure Communications System 304A to the destination Secure Communications System 304B. In particular, at transmission 602, an authenticated message is generated by a source computing device 302A and sent to the respectively connected source Secure Communications System 304A. In these examples, the source Secure Communications System 304A uses the private key to sign the message to be sent, as shown at transmission 604. At transmission 606, the destination Secure Communications System 304B computes the sources' public key using its address (SCSI), current time period, and the public master key, and at transmission 608, the verified message is transmitted to the destination computing device 302B.

The destination Secure Communications System 304B sends an acknowledgement, to the source Secure Communications System 304A, of receipt and successful transmission of the message to the destination computing device 302B, at transmission 610. Similarly, the source Secure Communications System 304A sends an acknowledgement, to the source computing device 302A, of receipt and successful transmission of the message to the destination computing device, at transmission 612.

In some instances, the access granting authority 308 may transmit a message to the access denying authority 312 indicating revoked access for a Secure Communications System. For example, at the transmission 614, the access granting authority informs the access denying authority of revoked access for the source Secure Communications System 302A, and the access denying authority thereby sends a revocation message to each of the Secure Communications Systems 302A, 302B that specifies the identity of the revoked Secure Communications System, an expiry time and a revocation time.

As shown by transmissions 616 and 618, the destination Secure Communications System 304B receives the revocation message. However, the source computing device 302A may still generate another message that is sent to the source Secure Communications System 304A, prior to the source Secure Communications System 304A receiving notification of its' revoked access. Thus, the source Secure Communications System 304A may proceed with transmitting the message at transmission 620, and later receive the revocation message at transmission 622. If the destination Secure Communications System 304B receives an authenticated revocation message for the source Secure Communications System 304A for a particular validity period, it will refuse to accept messages signed by the address of the source Secure Communications System 304A for the revoked validity period. The destination Secure Communications System 304B may therefore transmit a negative acknowledgement to the source Secure Communications System 304A indicating the failed data transmission, and the source Secure Communications System 304A may thereby transmit a negative acknowledgement to the source computing device, at transmissions 624 and 626.

Figure 7:
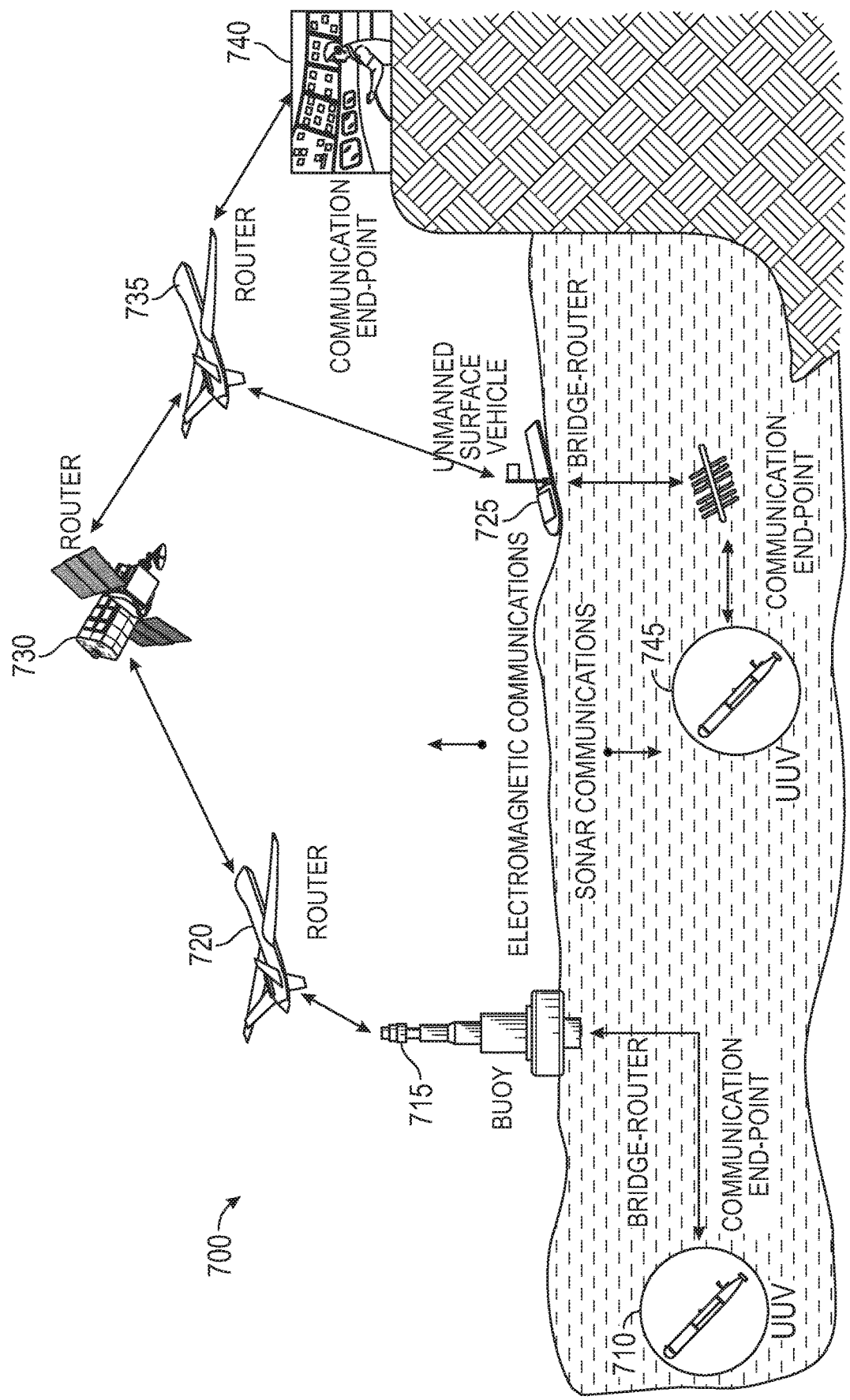
FIG. 7 illustrates a network topology for a data communications network for an underwater vehicle, according to one embodiment described herein.

FIG. 7 illustrates a network topology for a data communications network for an underwater vehicle, according to one embodiment described herein. As shown, the network 700 includes an unmanned underwater vehicle (UUV) 710, a UUV 745, a communications-equipped buoy 715, a communications-equipped aircraft 720, a satellite 730, a second communications-equipped aircraft 735, an unmanned surface aquatic vehicle 725 and a land-based surveillance station 740. The depicted network 700 illustrates a communication between the UUVs 710 and 745 and the surveillance station 740, and as such, the UUVs 710 and 745 and the surveillance station 740 represent communication endpoints, while the aircraft 720 and 735 represent router devices within the electromagnetic communications network. Similarly, the buoy 715 and unmanned surface aquatic vehicle 725 represent bridge-router devices, as these devices bridge the electromagnetic and acoustic communications networks and function as routers for relaying data packets between the UUV 710 and the aerial vehicles 720 and 735. Of note, in some instances, the UUVs 710 and 745 can serve as router devices within the network 700. For example, the UUV 710 could employ the techniques described herein to securely and reliably transmit data packets to the UUV 745, which in turn could securely and reliably forward the data packets to the unmanned surface aquatic vehicle 725 en route to the surveillance station 740.

Of note, while examples described herein refer to data originating at a UUV (e.g., 710) and travelling to a ground-based network node (e.g., a communication end-point within the ground-based surveillance station 740), such examples are provided for illustrative purposes only and without limitation. More generally, data can flow across the data communications network 700 to any number of destinations and in any direction. For example, a communication end-point within the ground-based surveillance station 740 could transmit a configuration file across the network 700 to the UUV 710, which could then be processed by a communication end-point within the UUV 710.

Figure 8:
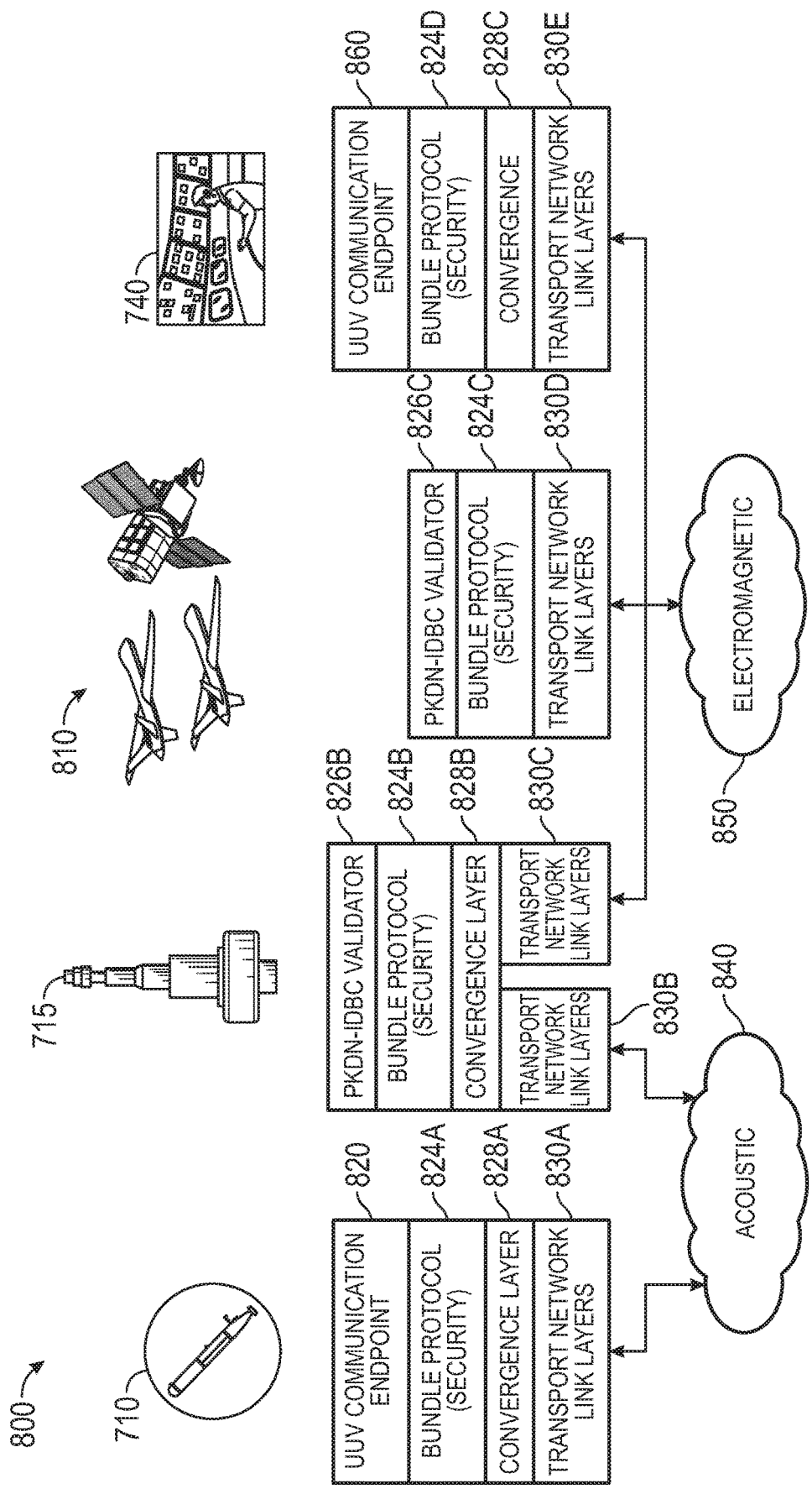
FIG. 8 is a block diagram illustrating network communication layers at points within a data communications network for an underwater vehicle, according to one embodiment described herein.

FIG. 8 is a block diagram illustrating network communication layers at points within a data communications network for an underwater vehicle, according to one embodiment described herein. As shown, the data communications network 800 includes the UUV 710, the buoy 715, aerial vehicles 810 and the surveillance station 740. As shown, UUV 710 and buoy 715 communicate via the acoustic network 840, while the buoy, aerial vehicles 810 and surveillance station 740 communicate via the electromagnetic network 850. Of note, the buoy 715 in the depicted embodiment serves as a bridge between the acoustic network 840 and the electromagnetic network 850. As shown, the headers of the data packets sent by each device, at their lowest layer depicted, contain transport network link layers information 830A-E.

Above the transport network link layers 830A-E, the data packet headers for the UUV 710, buoy 715 and surveillance station 740 contain a convergence layers 828A, 828B and 828C. Generally, the convergence layers 828A, 828B and 828C provide services through which bundles of data (e.g., DTN bundles) can be transmitted, e.g., across a native link, network or Internet protocol. For example, convergence layer adapter could be used to add a TCP-based convergence layer protocol, such as TCPCL, to the headers of the data packets. More generally, any suitable convergence layer can be used, consistent with the functionality described herein.

Additionally, above the convergence layers 828B and 828C for the buoy 715 and surveillance station 740, and above the transport network link layer 830D for the aerial vehicles 810, is a PKDN-IDBC Validator layer 826B-C within the data packet headers. As discussed above, an access denying authority can, as needed, send out revocation messages to the PKDN-IDBC validator nodes (e.g., buoy 715, aerial vehicles 810, etc.), indicating that authorization within the data communications network for a given network node (e.g., as designated by a unique identifier corresponding to the given network node) has been revoked. The UUV communication endpoints 820 and 860 generally represent software applications that are communicating with one another over the data communications network 800. For example, a monitoring application could execute on a computing system within the UUV 710 and could collect data using one or more sensor devices for the UUV 710 (e.g., camera sensors, sonar sensors, etc.). The monitoring application could then generate data packets containing at least an indication of the collected data and could transmit, using the communication techniques described herein, the data packets to a software application (e.g., represented by the UUV communication endpoint 860) within the surveillance station 740 for further analysis and/or display.

Generally, the DTN bundle protocol (security) layer can be configured to support opportunistic routing. For example, the bundle protocol (security) layer can use a number of routing techniques to transmit data packets, including forwarding-based routing (e.g., where data packets are sent across a single path towards their destination) and replication-based routing (e.g., where data packets are sent across multiple paths towards their destination). For example, for routing in a constant network topology (e.g., a system in which neighboring network nodes generally do not change), the bundle protocol (security) layer could be configured to use forwarding-based routing, as paths to the destination node will generally be constant. On the other hand, for routing in a variable network topology (e.g., a system in which UUVs frequently move in and out of communications range of various other devices within the network), the bundle protocol (security) layer could be configured to use replication-based routing, as the paths to the destination node may frequently change as the network topology shifts.

Figure 9:
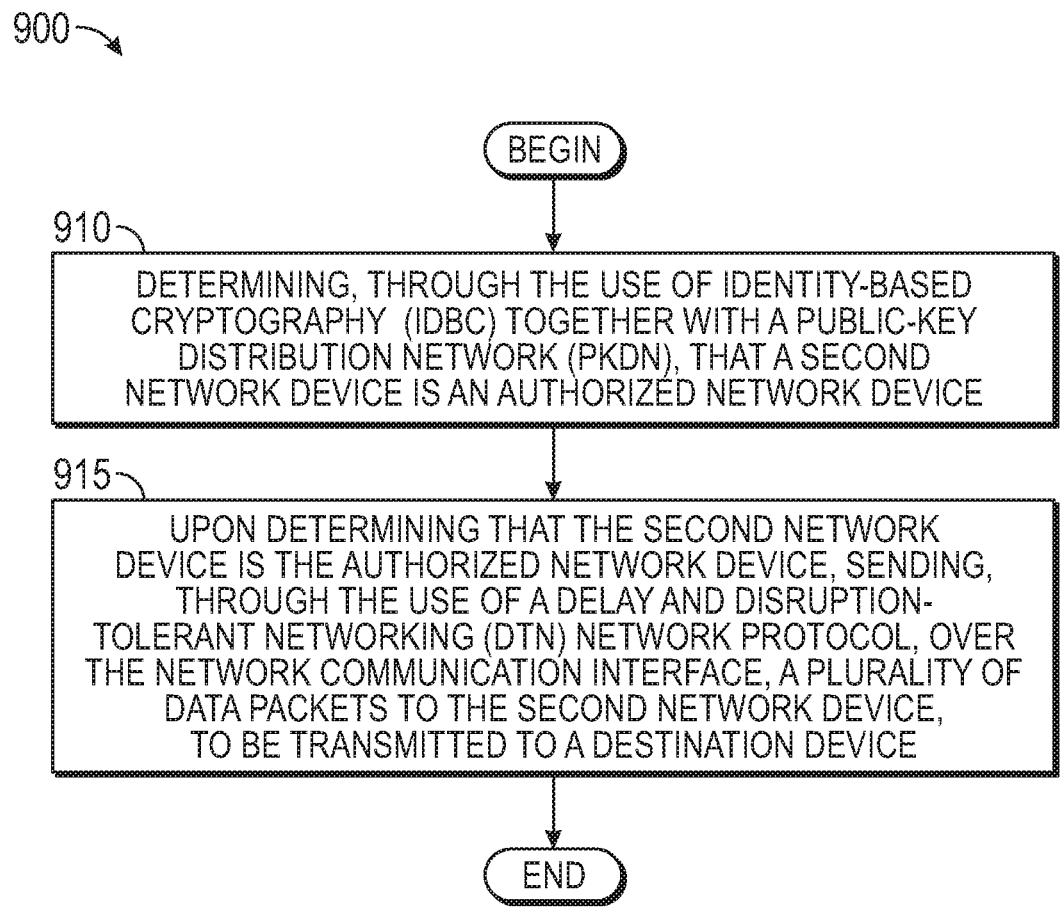
FIG. 9 is a flow diagram illustrating a method of transmitting data between nodes in a data communications network, according to one embodiment described herein.

FIG. 9 is a flow diagram illustrating a method of transmitting data between nodes in a data communications network, according to one embodiment described herein. As shown, the method 900 begins at block 910, where the secure communication component 120 determines, through the use of identity-based cryptography techniques, together with a public key distribution network, that a second network device is an authorized network device within the data communications network. For example, the secure communication component 120 could determine an identifier corresponding to the second network device and could determine that the identifier does not correspond to any identifiers on a revocation list.

The secure communication component 120 then, upon determining that the second network device is an authorized network device, transmits, through the use of a DTN network protocol, a plurality of data packets over a network communication interface to the second network device (block 915), and the method 900 ends. For example, the secure communication component 120 could overlay a bundle header over one or more lower-level networking headers within the data packets, where the bundle header is formatted according to the DTN protocol.

Figure 10:
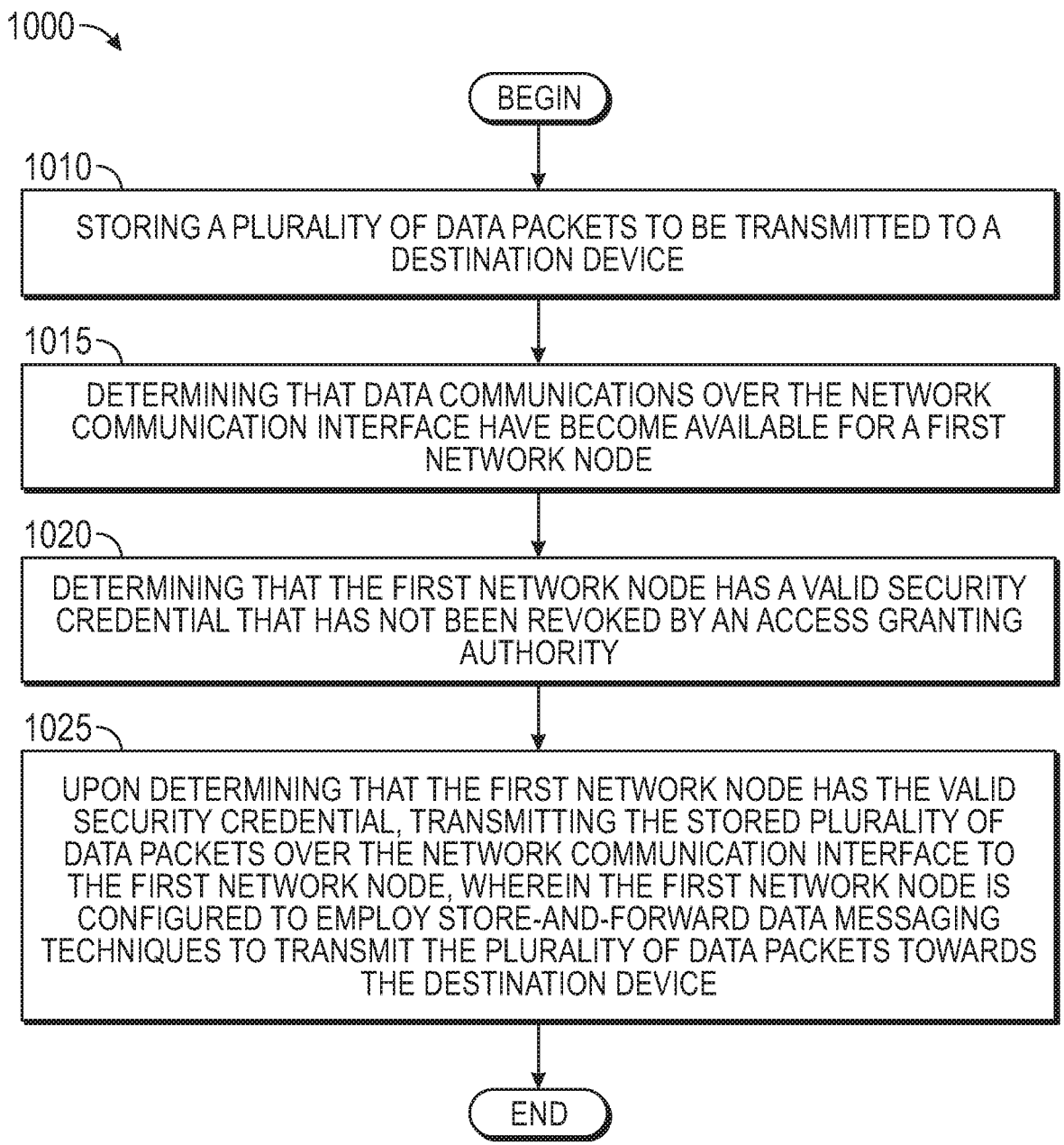
FIG. 10 is a flow diagram illustrating a method of transmitting data from an underwater vehicle in a data communications network, according to one embodiment described herein.

FIG. 10 is a flow diagram illustrating a method of transmitting data from an underwater vehicle in a data communications network, according to one embodiment described herein. As shown, the method 1000 begins at block 1010, where the secure communication component 120 stores a plurality of data packets to be transmitted to a destination device. Generally, the secure communication component 120 can continue to store data packets (e.g., generated by one or more applications, received from another network device using DTN or other store-carry and forward communication techniques) until a transmission condition is satisfied. For example, the secure communication component 120 could store the data packets until a network connection to an authorized network device is available and could only transmit the data packets once they are fully formed.

In the depicted embodiment, the secure communication component 120 determines that data communications over the network communication interface have become available for a first network node (block 1015). Additionally, the secure communication component 120 determines that the first network node has a valid security credential that has not been revoked by an access granting authority (block 1020). Upon determining that the first network node has the valid security credential, the secure communication component 120 transmits the stored plurality of data packets over the network communication interface to the first network node, where the first network node is configured to employ store-carry-and-forward data messaging techniques to transmit the plurality of data packets towards the destination device (block 1025), and the method 1000 ends.

Figure 11:
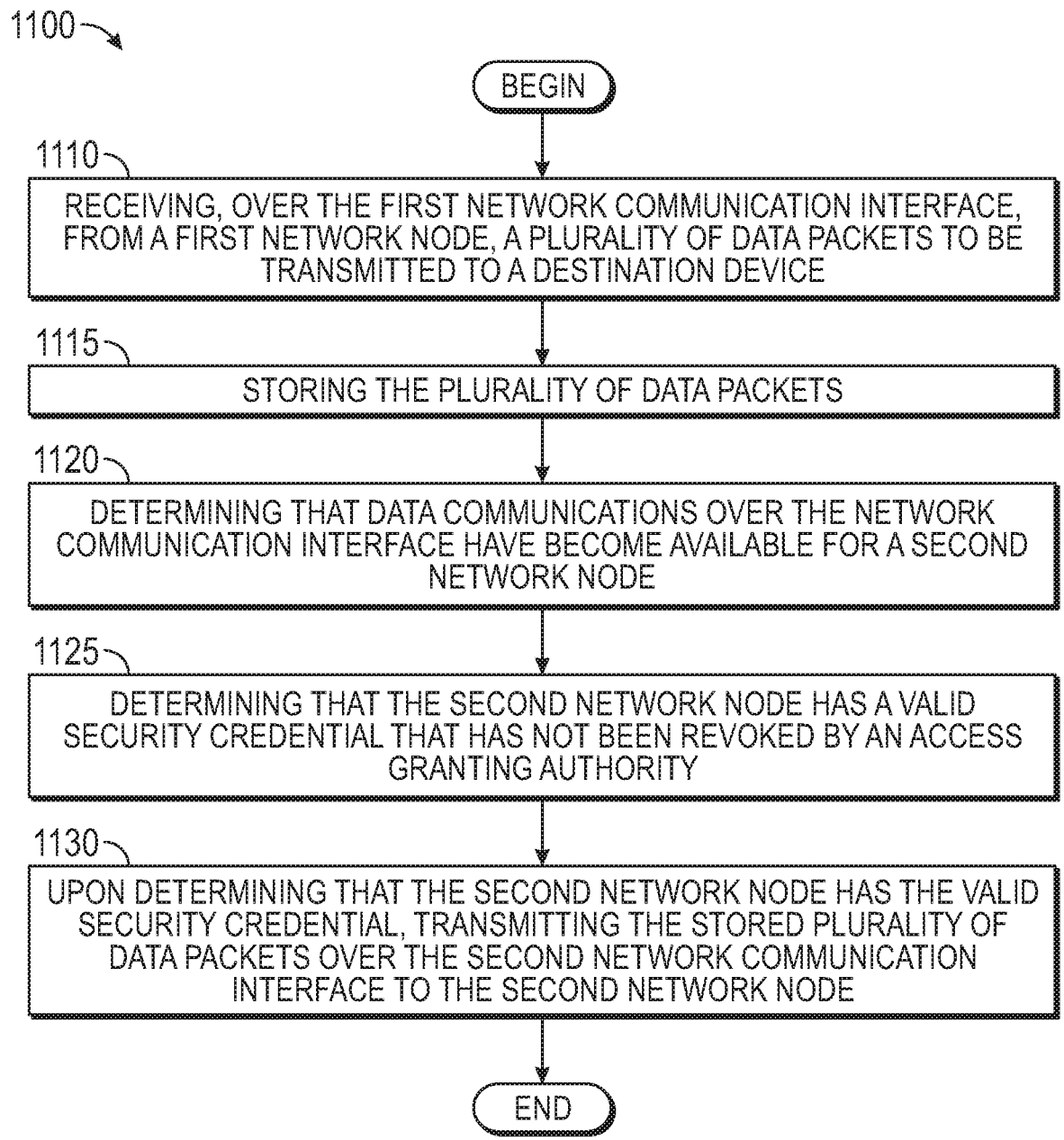
FIG. 11 is a flow diagram illustrating a method of transmitting data at an intermediary node in a data communications network, according to one embodiment described herein.

FIG. 11 is a flow diagram illustrating a method of transmitting data at an intermediary node in a data communications network, according to one embodiment described herein. As shown, the method 1100 begins at block 1110, where the secure communication component 120 receives, over the first network communication interface, from a first network node, a plurality of data packets to be transmitted to a destination device. The secure communication component 120 stores the plurality of data packets until a transmission condition is satisfied (block 1115).

The secure communication component 120 determines that data communications over the network communication interface have become available for a second network node (block 1120). The secure communication component 120 then determines that the second network node has a valid security credential that has not been revoked by an access granting authority (block 1125). Upon determining that the second network node has the valid security credential, the secure communication component 120 transmits the stored plurality of data packets over the second network communication interface to the second network node (block 1130), and the method 1100 ends.

Figure 12:
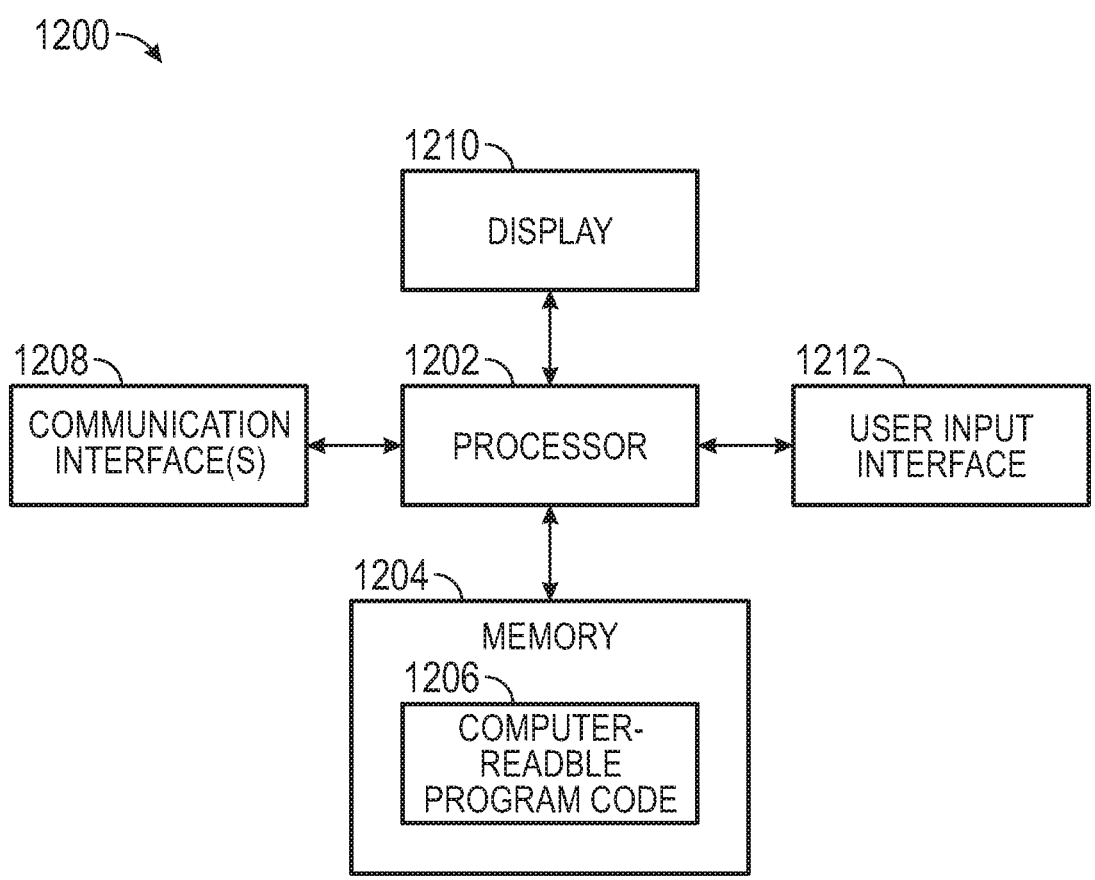
FIG. 12 is a block diagram illustrating a computing system, according to one embodiment described herein.

FIG. 12 is a block diagram illustrating a computing system, according to one embodiment described herein. Generally, an apparatus of example implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor 1202 (e.g., processor unit) connected to a memory 1204 (e.g., storage device).

The processor 1202 is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 1204 (of the same or another apparatus).

The processor 1202 may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory 1204 is generally any piece of computer hardware that is capable of storing information such as, for example, data, computer programs (e.g., computer-readable program code 1206) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for displaying, transmitting and/or receiving information. The interfaces may include a communications interface 1208 (e.g., communications unit) and/or one or more user interfaces one example of which may be the network port 204 of FIG. 2. The communications interface may be configured to transmit and/or receive information, such as to and/or from another apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 1120 and/or one or more user input interfaces 1212 (e.g., input/output unit). The display may be configured to present or otherwise display information to a user, suitable examples of which include a liquid crystal display (LCD), light-emitting diode display (LED), plasma display panel (PDP) or the like. The user input interfaces 1212 may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 1200 may include a processor 1202 and a computer-readable storage medium or memory 1204 coupled to the processor, where the processor is configured to execute computer-readable program code 1206 stored in the memory. It will also be understood that one or more functions, and combinations of functions, may be implemented by special purpose hardware-based computer systems and/or processors which perform the specified functions, or combinations of special purpose hardware and program code instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. An underwater communications system, comprising:
   a network communication interface;
   one or more computer processors; and
   a memory containing computer program code that, when executed by operation of the one or more computer processors, performs an operation comprising:
      storing a plurality of data packets to be transmitted to a destination device;
      determining that data communications over the network communication interface have become available for a first network node;
      determining that the first network node has a valid security credential;
      upon determining that the first network node has the valid security credential, transmitting the stored plurality of data packets over the network communication interface to the first network node, wherein the first network node is configured to employ store-carry-and-forward data messaging techniques to transmit the plurality of data packets towards the destination device;
      receiving a revocation message relating to the first network node; and
      verifying validity of the revocation message, based at least in part on an access denial key stored in the underwater communication system, wherein the access denial key is generated using an access authority and configured to use in verifying validity for a plurality of revocation messages.

2. The underwater communications system of claim 1, wherein determining that the first network node has the valid security credential further comprises:
   determining that the valid security credential has not been revoked by the access authority.

3. The underwater communications system of claim 1, the operation further comprising:
   storing a second plurality of data packets to be transmitted to a second destination device;
   determining that the data communications over the network communication interface are available for the first network node, for transmission of the second plurality of data packets; and
   determining that the first network node no longer has the valid security credential, based on verifying the validity of the received revocation message.

4. The underwater communications system of claim 3, wherein determining that the first network node no longer has the valid security credential further comprises:
   determining that a first identifier corresponding to the first network node matches a second identifier within a revocation list, wherein the revocation list includes a plurality of identifiers of network nodes having revoked access to at least one of a public master key and a private decryption key; and
   as a result, preventing transmission of the stored second plurality of data packets to the first network node.

5. The underwater communications system of claim 4, the operation further comprising:

receiving an identifier, an address and proof of identification associated with the underwater communications system;
generating the private decryption key, wherein the private decryption key that is unique to the underwater communications system; and
generating the public master key and the access denial key, wherein the access denial key is configured for use in verifying revoked access to the public master key or the private decryption key.

6. The underwater communications system of claim 5, the operation further comprising:
   transmitting the received revocation message to the underwater communications system indicating at least one message recipient having revoked access to the public master key or the private decryption key.

7. The underwater communications system of claim 6, wherein verifying the validity of the received revocation message further comprises:
   receiving and verifying the validity of the received revocation message, based at least in part on the access denial key; and
   in response to verifying the validity of the received revocation message, updating the revocation list to include an identifier of the at least one message recipient.

8. The underwater communications system of claim 1, the operation further comprising:
   upon determining that the first network node has the valid security credential:
      generating an ephemeral copy of a public encryption key, by passing a public master key, a validity period, and an identifier of the destination device as inputs for a key generator module; and
      encrypting the plurality of data packets using the generated ephemeral copy of the public encryption key.

9. The underwater communications system of claim 1, wherein the network communication interface further comprises an acoustics data transmission device.

10. The underwater communications system of claim 1, wherein transmitting the stored plurality of data packets over the network communication interface to the first network node employing store-carry-and-forward data messaging techniques to transmit the plurality of data packets towards the destination device, further comprises:
    for a first one of the plurality of data packets, determining that a retransmission condition has been satisfied; and
    retransmitting the first data packet over the network communication interface to the first network node.

11. The underwater communications system of claim 10, wherein the retransmission condition comprises at least one of (i) determining that an error occurred at an upstream network node and (ii) the first network node declining acceptance of the first data packet.

12. The underwater communications system of claim 1, wherein the store-carry-and-forward data messaging techniques further comprise a Delay and Disruption-Tolerant Networking (DTN) protocol, wherein the DTN protocol comprises overlaying a bundle protocol layer on top of one or more lower-layer networking protocol headers, wherein the one or more lower-layer networking protocol headers further comprise an Internet protocol (IP) layer.

13. The underwater communications system of claim 12, wherein the bundle protocol layer further comprises (i) a bundle header comprising one or more DTN blocks and (ii) application data.

14. The underwater communications system of claim 13, wherein the application data further comprises control information provided by a source application and that describes how to process payload data.

15. A network device for use in an underwater communications network in which at least one network node comprises an underwater vehicle, the network device comprising:
- a first network communication interface;
- a second network communication interface;
- one or more computer processors; and
- a memory containing computer program code that, when executed by operation of the one or more computer processors, performs an operation comprising:
  - receiving, over the first network communication interface, from a first network node, a plurality of data packets to be transmitted to a destination device;
  - storing the plurality of data packets;
  - determining that data communications over the second network communication interface have become available for a second network node;
  - determining that the second network node has a valid security credential; and
  - upon determining that the second network node has the valid security credential, transmitting the stored plurality of data packets over the second network communication interface to the second network node
  - receiving a revocation message relating to second network node; and
  - verifying validity of the revocation message, based at least in part on an access denial key stored in the underwater communications network, wherein the access denial key is generated using an access authority and configured to use in verifying validity for a plurality of revocation messages.

16. The network device of claim 15, wherein the first network communication interface comprises an acoustics transceiver for sending acoustic transmissions to and receiving acoustic transmissions from the underwater vehicle.

17. The network device of claim 15, wherein the second network communication interface comprises a radio signal transceiver for sending radio signals to and receiving radio signals from at least one of a satellite and an aerial vehicle.

18. The network device of claim 15, the operation further comprising:
- receiving, over the first network communication interface, from the first network node, a second plurality of data packets to be transmitted to the destination device;
- storing the second plurality of data packets;
- subsequent to storing the second plurality of data packets, determining that the data communications over the second network communication interface have become available for the second network node;
- determining that the second network node no longer has the valid security credential, based on verifying the validity of the received revocation message, comprising determining that a first identifier corresponding to the second network node matches a second identifier within a revocation list; and
- as a result, preventing transmission of the stored second plurality of data packets to the second network node.

19. The network device of claim 18, the operation further comprising:
- receiving an identifier, an address and proof of identification associated with the network device;
- generating a private decryption key that is unique to the network device; and
- generating a public master key and the access denial key wherein the access denial key is configured for use in verifying revoked access to the public master key or the private decryption key.

20. An underwater communications system, comprising:
- a network communication interface;
- one or more computer processors; and
- a memory containing computer program code that, when executed by operation of the one or more computer processors, performs an operation comprising:
  - determining, through use of identity-based cryptography (IDBC) together with a Public-Key Distribution Network (PKDN), that a second network device is an authorized network device;
  - upon determining that the second network device is the authorized network device, sending, through the use of a Delay and Disruption-Tolerant Networking (DTN) network protocol, over the network communication interface, a plurality of data packets to the second network device, to be transmitted to a destination device;
  - receiving a revocation message relating to the second network device; and
  - verifying validity of the revocation message, based at least in part on an access denial key stored in the underwater communications system, wherein the access denial key is generated using an access authority and configured to use in verifying validity for a plurality of revocation messages.

* * * * *

UNITED STATES PATENT AND TRADEMARK OFFICE
CERTIFICATE OF CORRECTION

PATENT NO. : 10,887,087 B2
APPLICATION NO. : 16/546727
DATED : January 5, 2021
INVENTOR(S) : Viswanathan et al.

Page 1 of 1

It is certified that error appears in the above-identified patent and that said Letters Patent is hereby corrected as shown below:

In the Claims

In Column 22, Line 5, in Claim 5, delete "that is" and insert -- is --, therefor.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*